United States Patent [19]
Baliga et al.

[11] Patent Number: 5,620,740
[45] Date of Patent: *Apr. 15, 1997

[54] SPUN CAST IR DETECTOR ARRAYS WITH INTEGRATED READOUT ELECTRONICS AND METHOD OF MAKING THE SAME

[75] Inventors: Shankar B. Baliga, Bethpage; George Rullman, Dix Hills; Alan P. Doctor, Sea Cliff, all of N.Y.

[73] Assignee: Servo Corporation of America, Hicksville, N.Y.

[ * ] Notice: The term of this patent shall not extend beyond the expiration date of Pat. No. 5,502,307.

[21] Appl. No.: 416,136

[22] Filed: Apr. 4, 1995

Related U.S. Application Data

[63] Continuation-in-part of Ser. No. 228,960, Apr. 18, 1994, Pat. No. 5,502,307.
[51] Int. Cl.$^6$ .............................. B05D 5/12; H04R 17/00; H01G 7/00
[52] U.S. Cl. .............................. 427/100; 427/79; 427/103; 427/101; 29/25.35; 29/25.42; 310/311
[58] Field of Search .......................... 250/338.3; 427/100, 427/101, 103, 79; 29/25.35, 25.41, 25.42; 310/311; 174/52.1, 52.2, 52.3

[56] References Cited

U.S. PATENT DOCUMENTS

| | | | |
|---|---|---|---|
| 4,070,578 | 1/1978 | Timothy et al. | 250/336 |
| 4,072,863 | 2/1978 | Roundy | 250/332 |
| 4,606,871 | 8/1986 | Krueger et al. | 264/22 |
| 4,906,849 | 3/1990 | Duo et al. | 250/338.3 |
| 5,030,827 | 7/1991 | Powell | 250/338.1 |
| 5,058,250 | 10/1991 | Turnbull | 29/25.35 |
| 5,502,307 | 3/1996 | Baliga et al. | 250/338.3 |

*Primary Examiner*—Shrive Beck
*Assistant Examiner*—Brian K. Talbot
*Attorney, Agent, or Firm*—Kane, Dalsimer, Sullivan, Kurucz, Levy, Eisele and Richard, LLP

[57] ABSTRACT

A process for making an infra-red detector array wherein an array of m * n first electrodes is formed on a substrate and a layer of plastic material having a polarization sensitive to infra-red radiation is deposited over the electrodes. The layer is partitioned into individual films each over an associated first electrode and second electrodes are positioned on the films on the side opposite to the associated first electrodes.

5 Claims, 4 Drawing Sheets

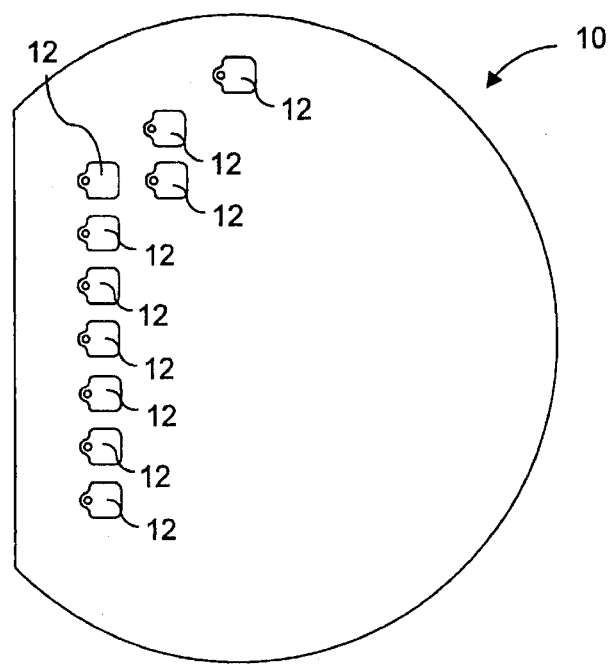
F I G. 3B
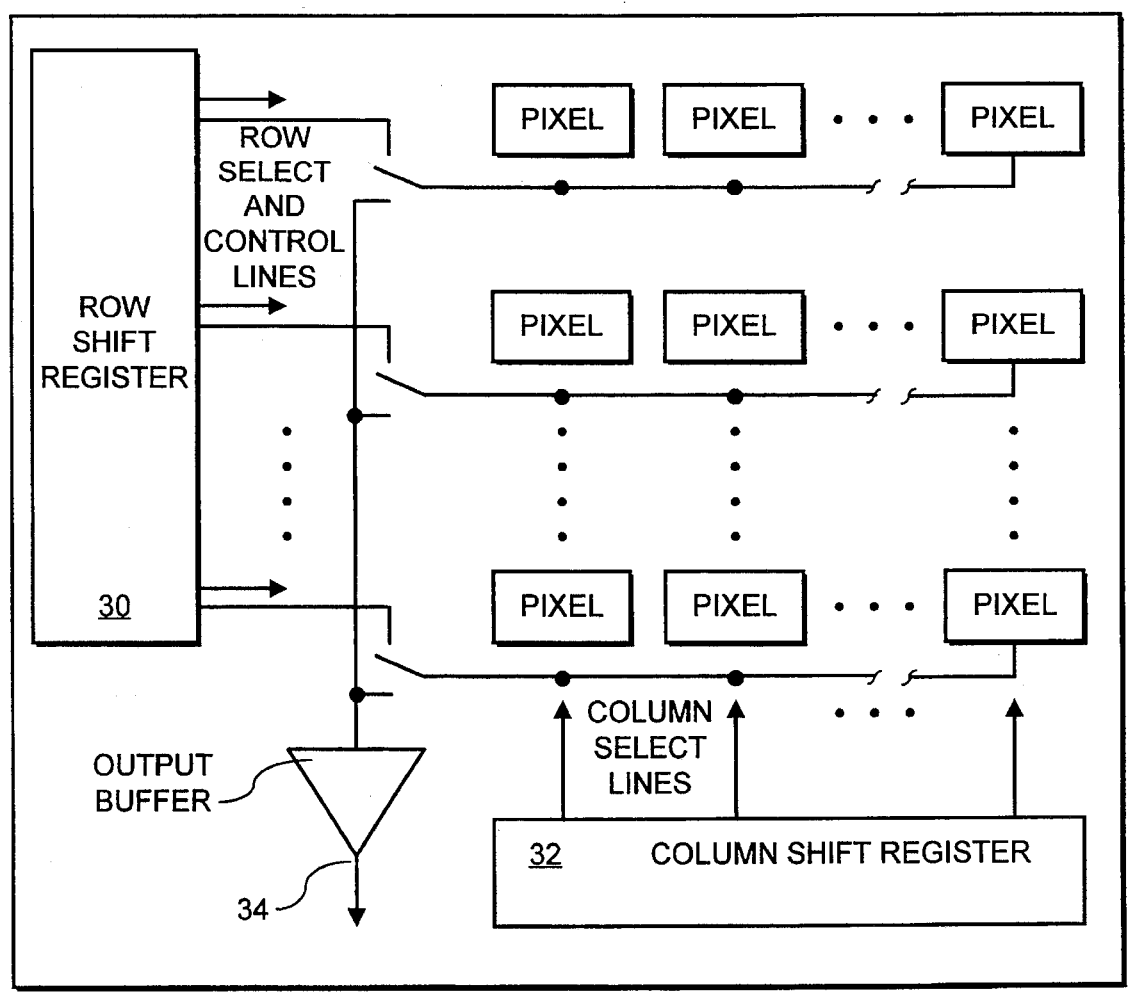
F I G. 4

SPUN CAST IR DETECTOR ARRAYS WITH INTEGRATED READOUT ELECTRONICS AND METHOD OF MAKING THE SAME

This is a continuation-in-part of application Ser. No. 08/228,960 filed on Apr. 18, 1994 now U.S. Pat. No. 5,502,307.

BACKGROUND OF THE INVENTION

1. Field of the Invention

This invention pertains to an IR focal plane array useful in IR imaging application, particularly to arrays formed by spin casting a plastic film onto a wafer, and more particularly to such a sensor where a pyroelectric film with top and bottom electrodes is deposited directly on a semiconductor wafer containing the readout structure.

2. Description of the Prior Art

Accurate and reliable temperature measurements and imaging are performed using solid-state lasers and non-linear optical materials, laser transmitter, detectors and LIDAR subsystems, and infrared detectors.

Photon detectors based on technologies such as lead salts, Schottky barriers and indium antimonide are also currently available. However, these detectors require cryogenic cooling to achieve high sensitivities. Furthermore, the quantum nature of the photon absorption implies not only a spectral cutoff wavelength but also a sensitivity which varies with respect to wavelength.

IR thermal detectors based on thermistor bolometers, thermopiles and pyroelectric detectors have been available for several decades. However, these suffer from the drawback of lower speeds in comparison with photon detectors.

To date, infrared imagery containing focal plane arrays of more than 80,000 "uncooled" detectors sensitive to infrared radiation in the 8 to 14 micron wavelength region have been fabricated and are available commercially. These detectors do not require cryogenic cooling or mechanical scanning, and have demonstrated noise-equivalent temperature difference (NETD) values of 0.1° C. Two different detector technologies, one ferroelectric and the other bolometric, have been used in these focal plane arrays. The uncooled sensor technology has been incorporated into commercial devices such as security sensors, weapon sights, handheld surveillance devices and for "night vision" displays.

However, these detectors have been found to be unsatisfactory. Uncooled focal plane array technologies, based on ferroelectronics, suffer from the requirement of bump-bonding to a readout circuit, typically active silicon electronic circuitry. Bump-bonding is a technique where the readout electronics of the m * n array and the detector array are two separate entities which are bonded together physically by an interfacing material, typically indium, which is in the shape of bumps or mounds on each of the m * n detector pixels and corresponding readout electronics (see FIG. 5). The detector array and the readout chip are physically aligned to form a one-to-one correspondence between each of the m * n bumps. The bump bonds are formed by heat or pressure until the detector array and readout chips are fused together. The bump-bonding approach is further plagued by quality-control problems such as mechanical damage to the detector due to the cold weld process, alignment and surface oxidation present on the "bump" material. Reticulated lithium tantalate pyroelectric arrays have also been used to fabricate uncooled focal plane arrays but also suffer from the requirement of bump-bonding.

Moreover, the detectors used in bump technology require reticulation due to the detector element thickness (typically 30 microns) of the pixel elements in order to reduce the thermal crosstalk, which is otherwise quite significant and causes deterioration of the modulation transfer function (MTF).

The present invention overcomes the manufacturing difficulties associated with bump bonding of pyroelectric detector arrays by utilizing an integral process where the detector array is grown directly on the wafer containing interface and readout electronics.

OBJECTS AND SUMMARY OF THE INVENTION

In view of the above-mentioned disadvantages of the prior art, an objective of the present invention is to provide a thermal detector which has a very fast response.

Yet another objective is to fabricate the m * n pixel pyroelectric detector array integral with the wafer containing the required interface and readout electronics.

Yet another objective is to provide a detector array which operates at ambient temperatures without the need of power-hungry heat exchangers, cooling devices or heating devices.

A further objective is to provide a detector array made of a pyroelectric polymer as well as a method of making the same.

Other objectives and advantages of the invention shall become apparent from the following description.

The subject invention pertains to new high-speed, high-sensitivity IR detector array capable of room temperature operation. This detector consists of sensors having a thin plastic pyroelectric film spun-cast onto a wafer containing the interface and readout circuitry.

The detector is made using a pyroelectric material which is a plastic film spun-cast from solution. The material is copolymer of polyvinylidene fluoride (PVDF) and trifluoroethylene (TrFE) with the ratios optimized for pyroelectric response. Preferably the ratio of PVDF to TrFE is in the range of 80:20 to 70:30 and more specifically, a ratio of 75:25. Unlike PVDF, the copolymer does not require mechanical stretching to become pyroelectrically active because of the TrFE which forces the material to crystallize in the polar beta form. The detector is made by first preparing a solution of copolymer in suspension, spin-casting the copolymer on a substrate to form a copolymer layer, and subsequently annealing and corona poling the layer. The layer has a thickness in the range of 0.3 to 3.0 microns. Wet and dry photolithographic processes are used to partition and delineate the resulting structure into sensors arranged into an m * n array.

Since the pyroelectric detector consists essentially of an active material (the copolymer film) disposed between capacitive electrodes, the spun-cast film can easily be patterned into IR sensors of different shapes and sizes from micron sizes to multi-inch elements limited only by the size of the host wafer and the processing equipment. The polymer layer can be applied very uniformly over the entire wafer. A wide or selective spectral range of detection is achieved through an absorptive coating deposited over the copolymer layer such as thin film nichrome or evaporated blacks.

The high speed of the device comes from the efficient heat sinking of the film by the wafer on which the copolymer is spun and the low thermal mass of the film. The high sensitivity of this pyroelectric film arises from it being extremely thin, in the range of 0.5 microns. The response of a pyroelectric detector is inversely proportional to its thickness. The low loss tangent and high current response result in a high sensitivity detector. The speed of response has been tested using high speed lasers and is known to be faster than 20 nanoseconds, the measurement being limited by available electronics. The copolymer film detector presents a high current response in comparison with the other pyroelectrics and is due primarily to the extreme thinness of pyroelectric material as compared with conventional pyroelectric crystals (LiTaO$_3$) and ceramics (PZT). The film also operates at ambient temperature and is genuinely uncooled, as contrasted to ferroelectric and microbolometric detectors which are usually claimed to be "uncooled", but in fact require temperature stabilization, often accomplished using thermoelectric cooler/heaters which are costly and require large amounts of power for operation.

BRIEF DESCRIPTION OF THE DRAWINGS

Further objects and advantages of the invention will become apparent from the following description and claims, and from the accompanying drawings, wherein:

FIG. 3b shows a top plane view of a silicon wafer containing a multiple m * n die.

FIG. 4 shows typical readout electronics for reading data from an m * n array.

DETAILED DESCRIPTION OF THE PREFERRED EMBODIMENT

Figure 1:
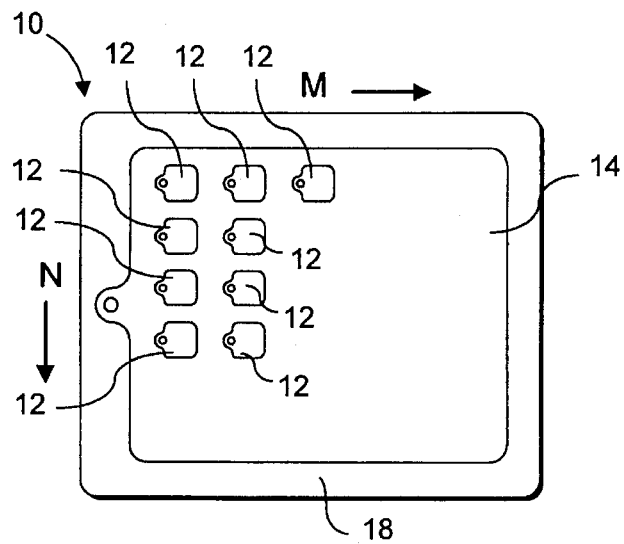
FIG. 1 shows a plane view of an IR detector array constructed in accordance with this invention.
Figure 2A:
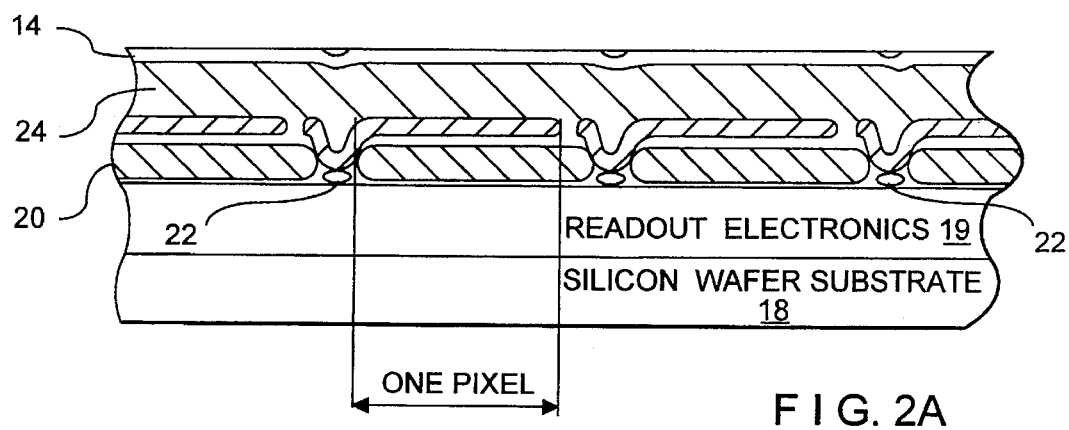
FIGS. 2a and 2b show side partial sectional and top views, respectively, of the IR detector array of FIG. 1.
Figure 2B:
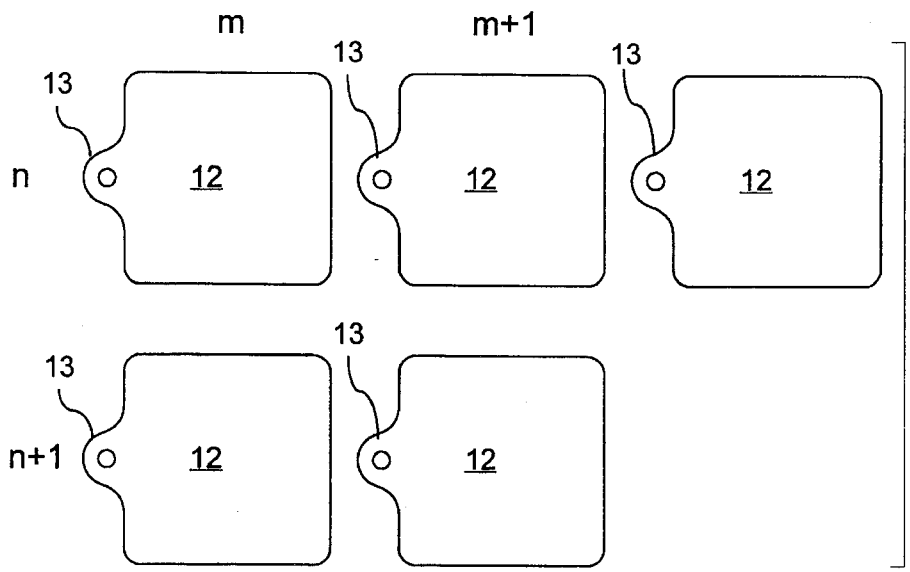

Referring now to the drawings in detail wherein like numerals refer to like elements throughout the several views, one sees a top view of the infrared detector array 10 of the present invention, which includes an m * n array of detectors 12 covered by a common top electrode 14 (typically made of nickel chromium) "m" being the number of elements in the horizontal direction and "n" being the number of elements in the vertical direction as shown in FIG. 1. Each detector 12 serves as a lower electrode for each individual pixel. Each detector 12 contains a protuberance 13, illustrated on the left side of each detector 12 in FIGS. 1 and 2b, which, as shown in FIG. 2a, serves an electrical communication path to the readout electronics 19 on silicon IC chip 18. The top electrode 14 likewise contains a protuberance 16 shown on the left hand side of top electrode 14, which serves as a return for the common top electrode.

FIG. 2a shows a cross-sectional side view of infrared detector array 10. The silicon substrate 18 upon which the readout electronics 19 (see FIGS. 2a and 4) is formed. A layer of insulating material 20, such as silicon monoxide, glass or polyimide, is formed over the IC chip with discontinuities 22 therein for the protuberance 13 of each detector 12 to selectively communicate with readout electronics 19.

A spun-cast pyroelectric copolymer layer 24, typically of a thickness on the order of 0.5 to 1.5 microns, is formed over the detectors 12 and a common upper electrode layer (typically nickel-chromium) 14 is formed over the copolymer layer 24. The common upper electrode layer 14, each detector 12, and the spun-cast pyroelectric polymer layer 24 therebetween form a capacitive device. Copolymer layer 24 is made of a plastic material such as PVDF (polyvinylidene fluoride) with TrFE (trifluoroethylene) which is spun-cast and activated to form a pyroelectric material which changes its polarization spontaneously in response to infrared radiation, thereby producing a charge which develops a voltage on the electrodes of the capacitor of the detector 12. This voltage is delivered to the readout electronics 19. Preferably, the copolymer layer 24 is composed of 75% PVDF and 25% TrFE. If an infrared image is projected onto the detector array 10 corresponding to the temperature profile of an object, this temperature profile can be sensed by addressing the m * n detector array and measuring the charge built up by the temperature change. The temperature change on each pixel is generated by a shutter or chopper positioned in front of the detector array. The contrast between the infrared energy from the chopper and the infrared energy from the scene is modulated at a suitable frequency to provide for high signal-to-noise and thereby a noise-equivalent temperature on the order of tenths of a degree or better.

FIG. 4 shows the typical readout electronics 19 which is formed on silicon wafer 18 in a multiplex configuration, including a shift row register 30 and a column row register 32 communicating and selectively reading the various detectors 12 individual pixels, with an output line 34 to an output buffer in a well-known configuration. Additionally, while not shown in FIG. 4, the readout electronics 19 of the detector array 10 includes buffering and amplification at each pixel prior to connection to the multiplexing array.

The detector array 10 shown in FIGS. 1, 2a, 2b and 3b has a number of advantages over the prior art. Because the copolymer layer 24 is deposited by spin-casting, its thickness can be controlled very accurately. Therefore, the production of sensor arrays is very efficient with a lower number of array chips being rejected. The array was also found to be very sensitive and to have a very fast response. While previous detector arrays had to be temperature controlled, i.e., they had to be maintained at a preselected nominal temperature which often was in the cryogenic range, the present detector array operates at room temperature and does not require any temperature control equipment.

Figure 3A:
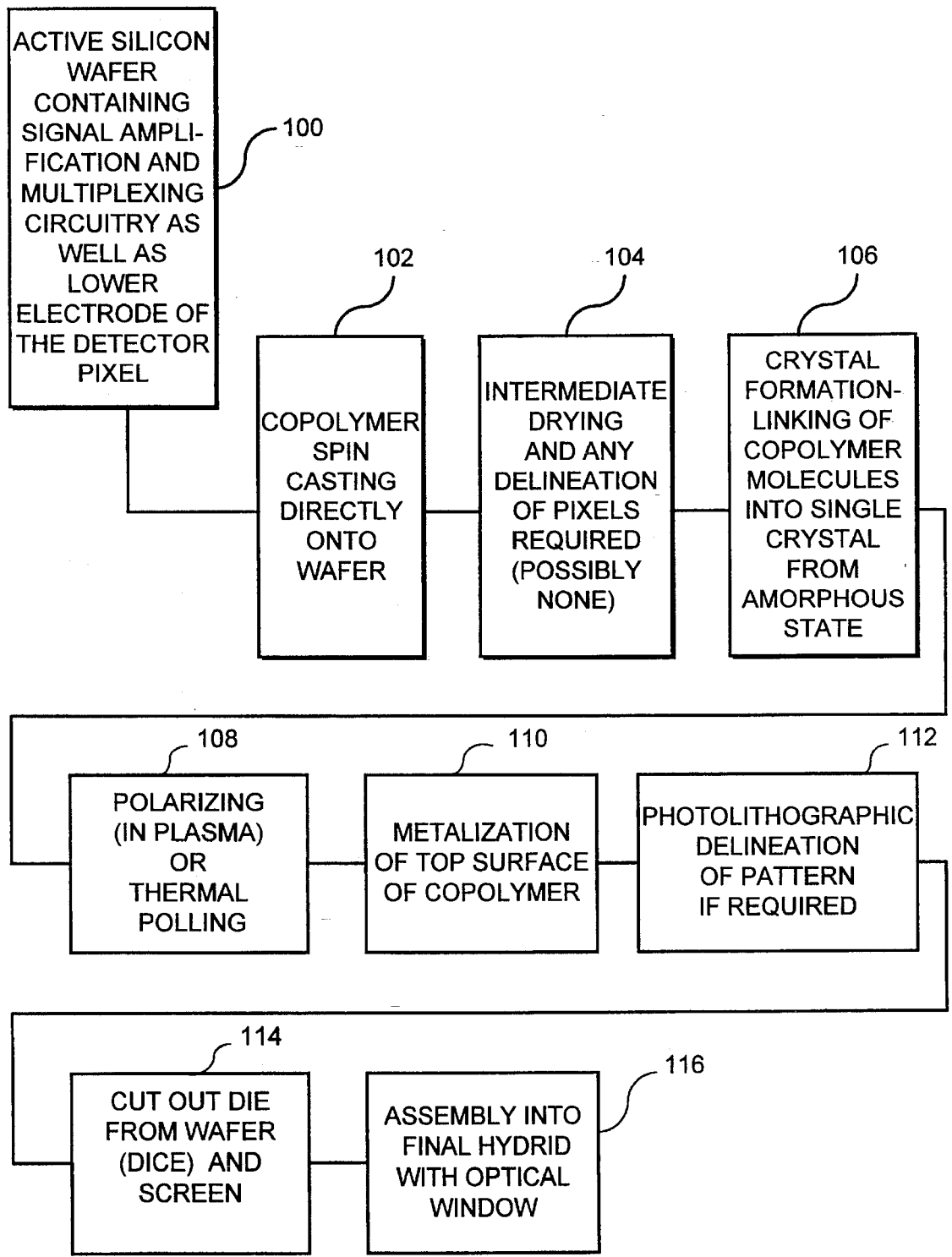
FIG. 3a shows a block diagram of the method used to make the array of FIG. 1.
Figure 5:
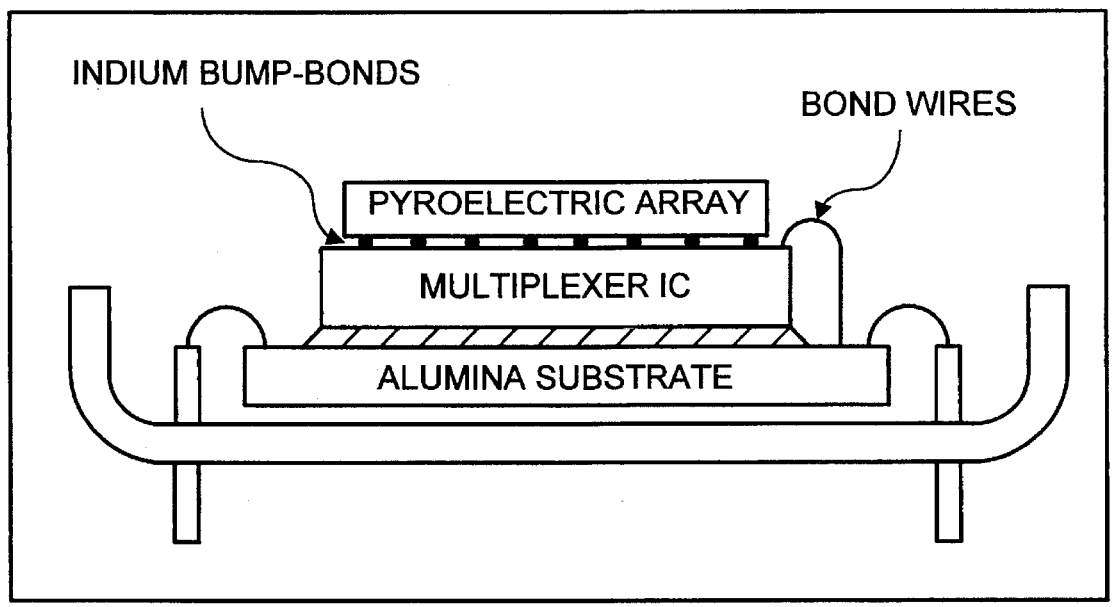
FIG. 5 shows a side view of the prior art, utilizing bump-technology to interconnect between an independently manufactured array of detectors and the readout electronics.

The method of making the detector array is now described in conjunction with the block diagram of FIG. 3a.

The base step 100 is to start with an active silicon wafer containing amplification and multiplexing circuitry and the insulating layer (see FIG. 4) as well as lower electrodes of the detector pixels (that is, detectors 12). The next step 102 is to spin cast the pyroelectric copolymer layer 24 directly onto the wafer. Step 104 is intermediate drying and possible delineation of the pixels. Step 106 is the crystal formation, linking the copolymer molecules into a single crystal from an amorphous state. Step 108 is polarizing in plasma or thermal polling of the copolymer layer 24. Step 110 is the metallization of the top surface of the copolymer layer 24 thereby forming top electrode 14 (typically made of nickel chromium). Step 112 is the photolithographic delineation of the pattern of the pixels, if required. Step 114 is the cutting out of the dye from the wafer and subsequent screening. Step 116 is the assembly into a final hybrid with an optical window.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method of making an infrared detector array comprising the steps of:

providing a substrate including readout electronics with m * n portions;

forming an m * n array of first electrodes on said substrate, m and n being integers representing the number of first electrodes of said array in each of two mutually perpendicular directions, each of said first electrodes of said m * n array being in electrical communication with corresponding portions of said readout electronics;

depositing a layer of plastic material on said first electrodes, said plastic material having a polarization sensitive to IR radiation;

partitioning said layer into a plurality of films, with one film being superimposed on each of said first electrodes; and applying an array of second electrodes on said films;

thereby forming an array of sensors, each array of sensors consisting of one first electrode, one second electrode, and one film disposed between said one first electrode and one second electrode.

2. The method of claim 1 wherein said depositing step includes the step of spin-casting said plastic material.

3. The method of claim 2 wherein said depositing step uses a copolymer of trifluoroethylene and polyvinylidene fluoride as said plastic material.

4. The method of claim 2 wherein said depositing step includes the step of depositing plastic material in a solution.

5. The method of claim 2 further comprising the step of activating said plastic material to form a pyroelectric material.

* * * * *